United States Patent
Pan et al.

(10) Patent No.: US 12,092,740 B2
(45) Date of Patent: Sep. 17, 2024

(54) POSITIONING METHOD AND DEVICE BASED ON MULTI-SENSOR FUSION

(71) Applicant: Beijing Tusen Weilai Technology Co., Ltd., Beijing (CN)

(72) Inventors: Liangliang Pan, Beijing (CN); Ji Zhao, Beijing (CN); Kaijin Ji, Beijing (CN)

(73) Assignee: Beijing Tusen Weilai Technology Co., Ltd., Beijing (CN)

( * ) Notice: Subject to any disclaimer, the term of this patent is extended or adjusted under 35 U.S.C. 154(b) by 210 days.

(21) Appl. No.: 17/378,484

(22) Filed: Jul. 16, 2021

(65) Prior Publication Data

US 2022/0018962 A1    Jan. 20, 2022

(30) Foreign Application Priority Data

Jul. 16, 2020   (CN) .......................... 202010686900.1

(51) Int. Cl.
*G01S 17/86*   (2020.01)
*G01S 17/42*   (2006.01)
(Continued)

(52) U.S. Cl.
CPC .............. *G01S 17/86* (2020.01); *G01S 17/42* (2013.01); *G01S 17/58* (2013.01); *G01S 17/931* (2020.01)

(58) Field of Classification Search
CPC ........ G01S 17/86; G01S 17/931; G01S 17/42; G01S 17/58
See application file for complete search history.

(56) References Cited

U.S. PATENT DOCUMENTS 11,153,503 B1 * 10/2021 Ebrahimi Afrouzi .. H04N 23/74
11,181,379 B2 * 11/2021 Babu ....................... H04L 67/12
(Continued)

FOREIGN PATENT DOCUMENTS

| CN | 109993113 A | 7/2019 |
|---|---|---|
| CN | 110726413 A | 1/2020 |

(Continued)

OTHER PUBLICATIONS

Schon S et al. Integrity and Collaboration in Dynamic Sensor Networks. Sensors (Basel). Jul. 23, 2018;18(7):2400. doi: 10.3390/s18072400. PMID: 30041498; PMCID: PMC6069503. (Year: 2018).*
(Continued)

*Primary Examiner* — Raymond L Nimox
(74) *Attorney, Agent, or Firm* — Perkins Coie LLP (57) ABSTRACT

A positioning method and device based on multi-sensor fusion are provided and relates to object positioning field. The method includes obtaining sensor data collected by various sensors on a movable object in real time; temporally and spatially synchronizing sensor data collected by the sensors to form various temporally and spatially synchronized sensor data; performing data preprocessing and correlation on the temporally and spatially synchronized sensor data to form to-be-jointly-optimized sensor data; obtaining state information at each time point before a current time point in a preset sliding window; and determining a current pose state of the movable object by performing a joint optimization according to the to-be-jointly-optimized sensor data and the state information at each time point before the current time point in the sliding window. The movable object can be accurately positioned in scenarios where GPS signals are lost, jumping exists, or LiDAR observation is degraded seriously.

16 Claims, 4 Drawing Sheets

(51) Int. Cl.
  *G01S 17/58* (2006.01)
  *G01S 17/931* (2020.01)

(56) References Cited

U.S. PATENT DOCUMENTS

| | | | | |
|---|---|---|---|---|
| 11,241,791 | B1* | 2/2022 | Ebrahimi Afrouzi | ... G06T 7/262 |
| 11,274,929 | B1* | 3/2022 | Afrouzi | G05D 1/0219 |
| 11,348,269 | B1* | 5/2022 | Ebrahimi Afrouzi | ..... G06T 7/33 |
| 2019/0368879 | A1* | 12/2019 | Roumeliotis | G07C 5/08 |
| 2019/0385339 | A1* | 12/2019 | Zhao | G06T 7/80 |
| 2021/0270612 | A1* | 9/2021 | Hou | G01S 17/86 |

FOREIGN PATENT DOCUMENTS

| | | |
|---|---|---|
| CN | 110837854 A | 2/2020 |
| CN | 111258313 A | 6/2020 |

OTHER PUBLICATIONS

S. A. S. Mohamed, M.-H. Haghbayan, T. Westerlund, J. Heikkonen, H. Tenhunen and J. Plosila, "A Survey on Odometry for Autonomous Navigation Systems," in IEEE Access, vol. 7, pp. 97466-97486, 2019, doi: 10.1109/ACCESS.2019.2929133. (Year: 2019).*

Nam DV, Gon-Woo K. Robust Stereo Visual Inertial Navigation System Based on Multi-Stage Outlier Removal in Dynamic Environments. Sensors (Basel). May 21, 2020;20(10):2922. doi: 10.3390/s20102922. PMID: 32455697; PMCID: PMC7288036. (Year: 2020).*

Koppe, Maro. European Application No. 21184662.1, Extended European Search Report Mailed, Dec. 17, 2021, pp. 1-11.

Anousaki, Georgia C. et al. "Simultaneous localization and map building of skid-steered robots", IEEE Robotic & Automation Magazine, IEEE Service Center, Piscataway, NJ US, vol. 14, No. 1, Mar. 1, 2007, pp. 1-11.

Kang, Rong et al. "VINS-Vehicle: A Tightly-Coupled Vehicle Dynamics Extension to Visual-Inertial State Estimator", IEEE Intelligent transportation Systems Conference (ITSC) Auckland, NZ, Oct. 27-30, 2019, pp. 1-8.

Chinese Patent Office, Ist Office Action for CN Appl. No. 202010686900.1, mailed Sep. 26, 2023, 36 pages with English translation.

Ye, Haoyang et al., "Tightly Coupled 3D Lidar Inertial Odometry and Mapping," 2019 International Conference on Robotics and Automation (ICRA), pp. 3144-3150, May 20-24, 2019.

Qin, Tong et al., "VINS-Mono: A Robust and Versatile Monocular Visual-Inertial State Estimator," IEEE Transactions on Robotics, vol. 34, No. 4, pp. 1004-1020, Aug. 2018.

Chinese Patent Office, Notification of Granting Patent Right for CN Appl. No. 202010686900.1, mailed Feb. 29, 2024, 10 pages with English translation.

* cited by examiner

POSITIONING METHOD AND DEVICE BASED ON MULTI-SENSOR FUSION

CROSS-REFERENCE TO RELATED APPLICATION

The present disclosure claims priority to Chinese Patent Application No. 202010686900.1, titled "POSITIONING METHOD AND DEVICE BASED ON MULTI-SENSOR FUSION", filed on Jul. 16, 2020, the content of which is incorporated herein by reference in its entirety.

TECHNICAL FIELD

The present disclosure relates to the object positioning technology field, and more particularly to a positioning method and device based on multi-sensor fusion.

BACKGROUND

Currently, with the development of autonomous driving technology, intelligent robots and unmanned aerial vehicle (UAV) technology, ensuring the precise positioning of an autonomous vehicle, an intelligent robot, or a UAV has become a hot issue. Various sensors can be generally equipped on a movable object, such as an autonomous vehicle, an intelligent robot, or a UAV, so as to facilitate the perception of the surrounding environment and to position according to the perception information.

However, the positioning of the autonomous vehicle, the intelligent robot, or the UAV needs to rely on good global positioning system (GPS) signals and good light detection and ranging (LiDAR) perception to achieve precise positioning. In a scenario where GPS signals are lost, in a jumping scenario (such as a tunnel or a street where satellite signals are blocked by a tall building), or in a scenario where a LiDAR observation is degraded seriously (such as an open cross-sea bridge, a highway, or a tunnel), performing accurate positioning of the autonomous vehicle, the intelligent robot, or the UAV has become an urgent problem to be solved.

SUMMARY OF DISCLOSURE

Embodiments of the present disclosure provide a positioning method and device based on multi-sensor fusion capable of performing accurate positioning of a movable object in a scenario where GPS signals are lost, in a jumping scenario, or in a scenario where a LiDAR observation is degraded seriously.

To achieve the above-mentioned objective, the embodiments of the present disclosure adopt the following technical schemes.

A first aspect of an embodiment of the present disclosure provides a positioning method based on multi-sensor fusion and applied to a movable object equipped with various sensors. The method includes: obtaining sensor data collected by the various sensors equipped on the movable object in real time; temporally and spatially synchronizing the sensor data collected by the various sensors to form various temporally and spatially synchronized sensor data; performing data preprocessing and data correlation on the various temporally and spatially synchronized sensor data to form to-bejointly-optimized sensor data; obtaining state information at each time point before a current time point in a preset sliding window; and determining a current pose state of the movable object by performing a joint optimization solution according to the to-be-jointly-optimized sensor data and the state information at each time point before the current time point in the sliding window.

Furthermore, a second aspect of an embodiment of the present disclosure provides a positioning device based on multi-sensor fusion and applied to a movable object equipped with various sensors. The device includes: a sensor data obtaining unit, configured to obtain sensor data collected by the various sensors equipped on the movable object in real time; a time and space synchronization unit, configured to temporally and spatially synchronize the sensor data collected by the various sensors to form various temporally and spatially synchronized sensor data; a data preprocessing unit, configured to perform data preprocessing and data correlation on the various temporally and spatially synchronized sensor data to form to-be-jointly-optimized sensor data; a state information obtaining unit, configured to obtain state information at each time point before a current time point in the preset sliding window; and a joint optimization unit, configured to determine a current pose state of the movable object by performing a joint optimization solution according to the to-be-jointly-optimized sensor data and the state information at each time point before the current time point in the sliding window Furthermore, a third aspect of an embodiment of the present disclosure provides a computer-readable storage medium including a program or instructions. The program or instructions when executed by a computer, implement the positioning method based on multi-sensor fusion in the first aspect.

Furthermore, a fourth aspect of an embodiment of the present disclosure provides a computer program product. The computer program product when executed by a computer, causes the computer to implement the positioning method based on multi-sensor fusion in the first aspect.

Furthermore, a fifth aspect of an embodiment of the present disclosure provides a server including a memory and one or more processors communicatively connected to the memory. The memory stores instructions executable by the one or more processors. The instructions when executed by the one or more processors, causes the one or more processors to implement the positioning method based on multi-sensor fusion in the first aspect.

The embodiments of the present disclosure provide a positioning method and device based on multi-sensor fusion. First, sensor data collected by various sensors equipped on a movable object is obtained in real time. The sensor data collected by the various sensors is temporally and spatially synchronized to form various temporally and spatially synchronized sensor data. Data preprocessing and data correlation are performed on the various temporally and spatially synchronized sensor data to form to-be-jointly-optimized sensor data. Then, state information at each time point before a current time point in a preset sliding window is obtained. A current pose state of the movable object is determined by performing a joint optimization solution according to the to-be-jointly-optimized sensor data and the state information at each time point before the current time point in the sliding window. It can be seen that the present disclosure can combine various sensor data, process the various sensor data via a sliding window, and updates the state information at the current time point in real time. Accordingly, the movable object can be accurately positioned in a scenario where GPS signals are lost, in a jumping scenario, or in a scenario where a LiDAR observation is degraded seriously.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person skilled in the art may still derive other drawings from these accompanying drawings without creative efforts.

DETAILED DESCRIPTION OF EMBODIMENTS

The following clearly and completely describes the technical solutions in the example embodiments of the present disclosure with reference to the accompanying drawings in the example embodiments of the disclosure. Apparently, the described embodiments are merely some but not all of the embodiments of the present disclosure. All other embodiments obtained by a person skilled in the art based on the embodiments of the present disclosure without creative efforts shall fall within the protection scope of the present disclosure.

It should be noted that in the specification, the claims, and the accompanying drawings of the present application, the terms "first", "second", and the like are intended to distinguish between similar objects but do not necessarily indicate a specific order or sequence. It should be understood that the data used in this way are interchangeable in an appropriate case, so that the exemplary embodiments described herein may be implemented in an order other than the order illustrated or described herein. Moreover, the terms "include" and "contain" and any other variants thereof are intended to cover a non-exclusive inclusion. For example, a process, a method, a system, a product, or a device that includes a series of steps or units is not limited to the listed steps or units, but may include other steps or units not expressly listed or inherent to such a process, method, system, product, or device.

In order to make a person skilled in the art better understand the present disclosure, some of the technical terms used in the embodiments of the present disclosure are explained as follows.

A movable object refers to an object which can collect a map, such as a vehicle, a mobile robot, or an aircraft. The movable object can be equipped with various sensors, such as a LiDAR or a camera.

GNSS refers to "Global Navigation Satellite System".

GPS refers to "Global Positioning System".

IMU refers to "Inertial Measurement Unit" and is a device for measuring a three-axis attitude angle (or an angular rate) and acceleration of an object.

A high-precision map is different from a traditional navigation map. The high-precision map includes a large amount of driving assistance information. The most important information is an accurate three-dimensional representation of a road network, such as layout of intersections and locations of road signs. Furthermore, the high-precision map also includes a lot of semantic information. The map may report the meaning of different colors of a communication traffic light and may indicate the speed limit of a road and a position where a left-turn lane starts. One of the most important features of the high-precision map is accuracy. The high-precision map can enable vehicles to achieve centimeter-level accuracy, which is important to ensure the safety of an autonomous vehicle.

A pose is a general term of a position and an orientation and includes 6 degrees of freedom. The 6 degrees of freedom includes 3 degrees of freedom for position and 3 degrees of freedom for orientation. The 3 degrees of freedom for orientation are usually expressed by a pitch angle, a roll angle, and a yaw angle.

A frame refers to measurement data received by a sensor after completing an observation. For example, a frame of data of a camera is a picture, or a frame of data of a LiDAR is a set of laser point clouds.

A registration refers to a relative pose relationship at two observation time points obtained by matching observation results at different time points and at different positions in the same area.

A singular value decomposition (SVD) is an important matrix decomposition in linear algebra.

Real-Time Kinematic (RTK), i.e. real-time dynamic carrier phase difference technology, refers to a differential method where carrier phase observations of two measuring stations are processed in real time. In the differential method, the carrier phase collected by a reference station is sent to a user receiver for obtaining a difference and calculating a coordinate.

A multi-state constraint Kalman filter (MSCKF) refers to a Kalman filter in a multi-state constraint.

In some embodiments of the present disclosure, the term "vehicle" is broadly construed herein to cover any moving object, including, for example, an aerial vehicle, a watercraft, a spacecraft, a car, a truck, a van, a semi-trailer truck, a motorcycle, a golf cart, an off-road vehicle, a warehouse transport vehicle, or a farm vehicle, as well as a carrier which rides on a track such as a roller coaster, a trolley, a tram, a train car, or any rail vehicle. The vehicle in the present disclosure can usually include a power system, a sensor system, a control system, a peripheral device, and a computer system. In other embodiments, the vehicle can include more, fewer, or different systems.

Herein, the power system is a system which supplies power to the vehicle and includes an engine/motor, a transmission, wheels/tyres, and a power source unit.

The control system can include a combination of devices which control the vehicle and components of the vehicle, such as a steering unit, a throttle, and a brake unit.

The peripheral device can be a device which allows the vehicle to interact with external sensors, other vehicles, external computing devices, and/or users, such as a wireless communication system, a touch screen, a microphone, and/or a speaker.

Based on the vehicle described above, an autonomous vehicle can be further provided with the sensor system and an autonomous control device.

The sensor system can include a plurality of sensors for sensing information of an environment where the vehicle is located, and one or more actuators which change respective positions and/or directions of the sensors. The sensor system can include any combinations of sensors, such as a Global Positioning System sensor, an inertial measurement unit, a radio detection and ranging (RADAR) unit, a camera, a laser rangefinder, a Light detection and ranging (LiDAR) unit, and/or an acoustic sensor. The sensor system can further include at least one sensor which monitors the vehicle's internal systems (such as an $O_2$ monitor, a fuel gauge, and an engine thermometer).

The autonomous control device can include a processor and a memory. The memory includes at least one machine executable instruction stored therein. The processor executes the at least one machine executable instruction to implement a function, such as a map engine, a positioning module, a perception module, a navigation or route module, or an autonomous control module. The map engine and the positioning module are configured to provide map information and positioning information. The perception module is configured to perceive at least one object in the environment around the vehicle based on information obtained by the sensor system and the map information provided by the map engine. The navigation or route module is configured to plan a driving route for the vehicle based on processing results from the map engine, the positioning module, and the perception module. The autonomous control module is configured to convert decision information inputted from a module such as the navigation or route module into a control command for outputting to a vehicle control system, and transmit the control command to respective components in the vehicle control system via an in-vehicle network (for example, an in-vehicle electronic network system implemented using a CAN bus, a local interconnection network, or a multimedia directional system transmission) for implementing autonomous control of the vehicle. The autonomous control module can also obtain information of respective components in the vehicle via the in-vehicle network.

Currently, there are several types of positioning solutions for a movable object. These positioning solutions are highly dependent on a positioned scenario.

For example, in the first type of positioning solution, a quadrotor drone mainly uses a camera and an IMU for a sensor fusion positioning. For another example, in the second type of positioning solution, an indoor wheel speed robots mainly uses a camera and a wheel speedometer to perform a sensor combination positioning. However, the above-mentioned two methods have high requirements for stable data correlation of visual observation. When a scenario having weak textures and a large number of repeated textures is encountered, state variables of the IMU cannot obtain updating of accurate visual constraints. As such, estimations of the state variables are not accurate, and drift occurs. Furthermore, in an outdoor scenario, the above-mentioned two methods are affected by sunlight, exposure, or shelter. Moreover, in most cases of uniform velocity motion or uniform acceleration motion, the IMU cannot be sufficiently stimulated. As such, noises of the original observation (acceleration of an accelerometer and angular velocity of a gyroscope) are great. This situation affects the observability of a visual-IMU tightly coupled system.

For yet another example, in the third type of positioning solution, an unmanned vehicle positioning system based on machine vision performs feature association and vehicle positioning via semantic information and a semantic map on a picture. The unmanned vehicle positioning system also includes GPS fusion and a fusion scheme of a plurality of cameras and an IMU sensor to perform the vehicle positioning. For the third type of positioning solution, a combination of sensors which rely on the semantic information based on vision to perform state estimation and positioning cannot obtain stable and accurate data correlation for a long time in an unstructured scenario (no semantic landmarks such as lane lines). As such, the accuracy and robustness of the state estimation are affected.

For yet another example, in the fourth type of positioning solution, an unmanned vehicle positioning system based on LiDAR performs feature association via a LiDAR observation and a reflectance map or a feature map of a global LiDAR and fuses RTK or other sensors to perform combination state estimation. In some schemes, a LiDAR and an IMU are fused to perform state estimation of the unmanned vehicle. Alternatively, a scheme of fusing a filtering framework of MSCKF with visual-LiDAR-IMU is used for performing state estimation of a vehicle. For the above-mentioned fourth type of positioning solution, the observation of the LiDAR is degraded seriously in an open scenario. As such, data of the LiDAR and the IMU cannot be updated in real time, and the sensors cannot output stable states robustly.

For yet another example, the fifth type of positioning solution is an outdoor unmanned vehicle positioning system based on GPS. However, when the fifth type of positioning solution is used in an outdoor high-dynamic environment, especially in a scenario, such as an urban street with tall buildings, or a tunnel with obstructions, the problem of GPS multipath reflection is quite obvious. At this time, a positioning error of GPS occurs from a few meters to tens of meters, and thus positioning requirements cannot be met in an autonomous driving scenario.

Embodiments of the present disclosure aim to propose a tightly coupled multi-sensor fusion positioning solution based on a LiDAR point cloud map and aim to improve the positioning robustness and accuracy of an autonomous driving positioning system in complex scenarios, so that the multi-sensor fusion positioning solution can be applied to a scenario where GPS signals are lost, a jumping scenario (such a tunnel or a street where satellite signals are blocked by a tall building), or a scenario where a LiDAR observation is degraded seriously (such as an open cross-sea bridge, a highway, or a tunnel).

Figure 1:
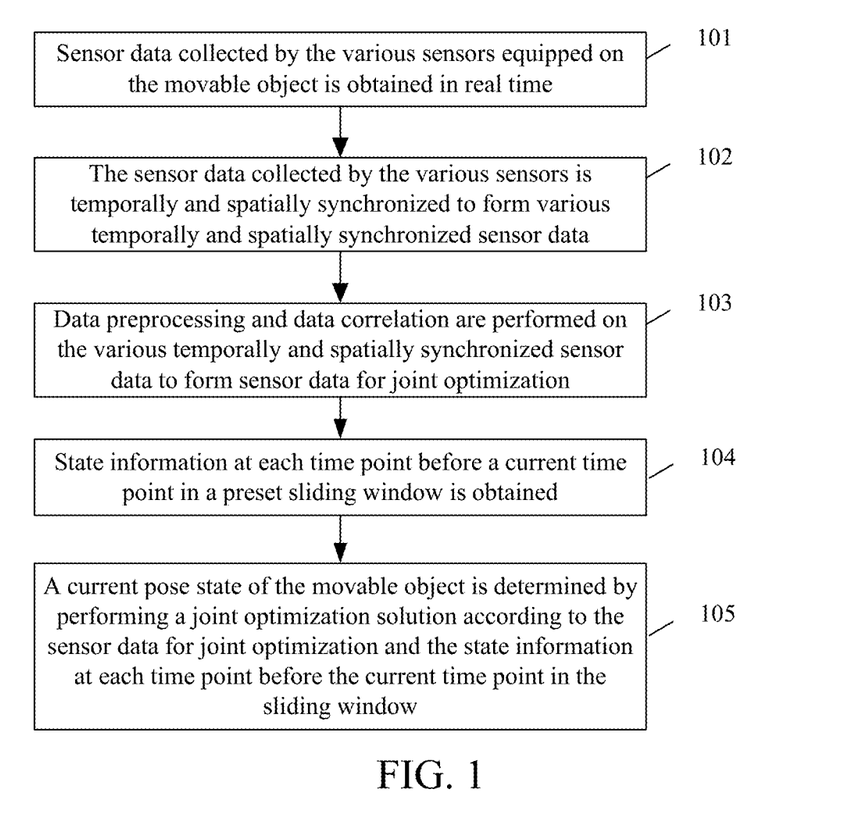
FIG. 1 illustrates a first flowchart of a positioning method based on multi-sensor fusion provided by an embodiment of the present disclosure.

As shown in FIG. 1, an embodiment of the present disclosure provides a positioning method based on multi-sensor fusion. The method is applied to a movable object equipped with various sensors. The method includes the following steps.

In step 101, sensor data collected by the various sensors equipped on the movable object is obtained in real time.

In step 102, the sensor data collected by the various sensors is temporally and spatially synchronized to form various temporally and spatially synchronized sensor data.

In step 103, data preprocessing and data correlation are performed on the various temporally and spatially synchronized sensor data to form sensor data for joint optimization.

In step 104, state information at each time point before a current time point in a preset sliding window is obtained.

In step 105, a current pose state of the movable object is determined by performing a joint optimization solution according to the sensor data for joint optimization and the state information at each time point before the current time point in the sliding window.

Figure 2:
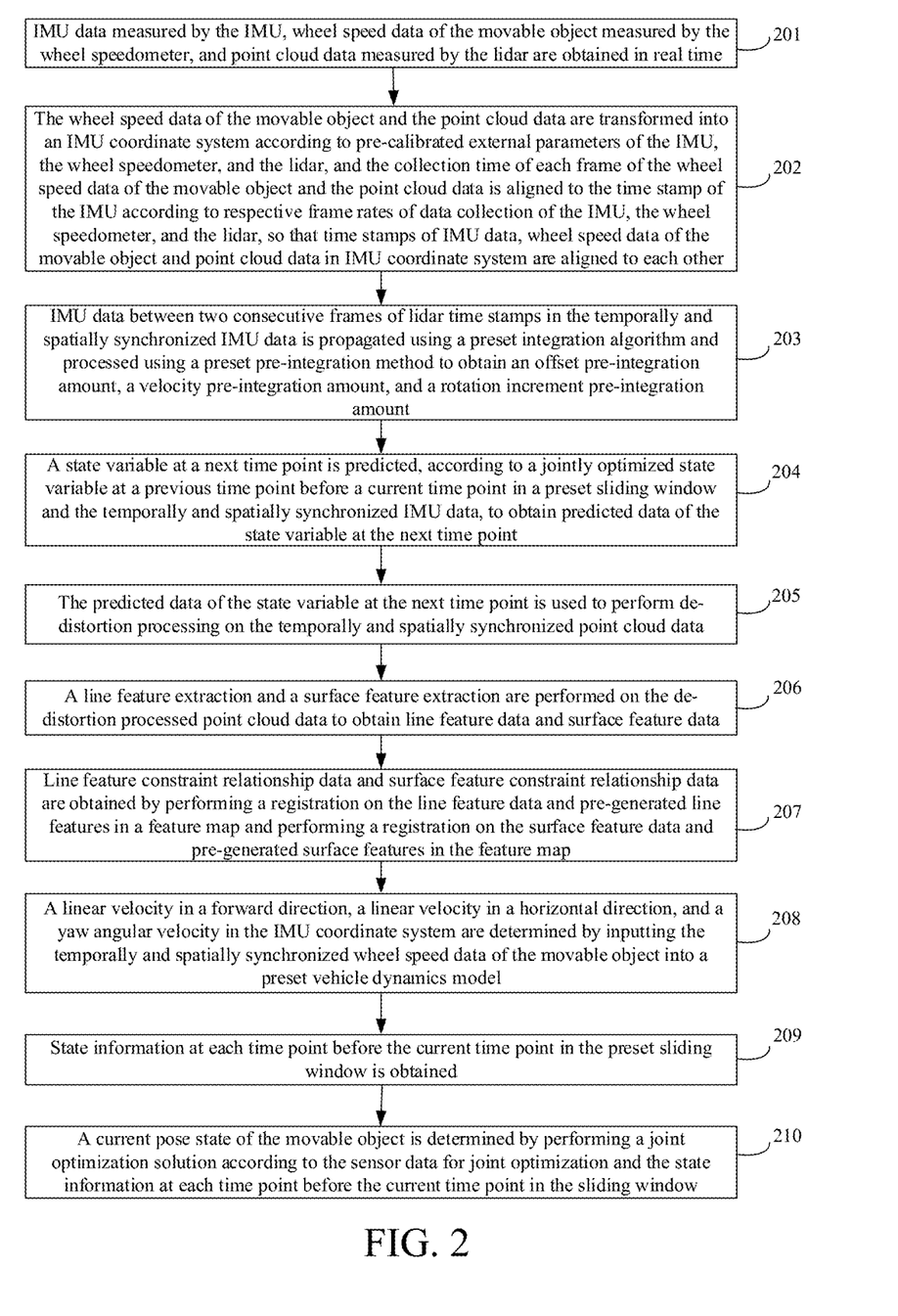
FIG. 2 illustrates a second flowchart of a positioning method based on multi-sensor fusion provided by an embodiment of the present disclosure.

In order to make a person skilled in the art better understand the present disclosure, the present disclosure is further described in detail combined with the following specific embodiments. As shown in FIG. 2, an embodiment of the present disclosure provides a positioning method based on multi-sensor fusion. The method is applied to a movable object equipped with various sensors. The various sensors can include an IMU, a wheel speedometer, a LiDAR and so on but are not limited thereto. For example, in general situations, the various sensors further can include a camera, a GPS sensor and so on. The IMU includes an accelerometer and a gyroscope.

The method includes the following steps.

In step 201, IMU data measured by the IMU, wheel speed data of the movable object measured by the wheel speedometer, and point cloud data measured by the LiDAR are obtained in real time.

In step 202, the wheel speed data of the movable object and the point cloud data are transformed into an IMU coordinate system according to pre-calibrated external parameters of the IMU, the wheel speedometer, and the LiDAR, and the collection time of each frame of the wheel speed data of the movable object and the point cloud data is aligned to the time stamp of the IMU according to respective frame rates of data collection of the IMU, the wheel speedometer, and the LiDAR, so that the time stamps of IMU data, wheel speed data of the movable object, and point cloud data in the IMU coordinate system are aligned to each other.

In step 203, IMU data between two consecutive frames of LiDAR time stamps in the temporally and spatially synchronized IMU data is propagated using a preset integration algorithm and processed using a preset pre-integration method to obtain an offset pre-integration amount, a velocity pre-integration amount, and a rotation increment pre-integration amount.

It is noted that original data of the IMU generally includes data of acceleration and angular velocity including biases and noises. Accordingly, it is necessary to perform the temporal and spatial synchronization in step 202. Then, the IMU data between the two consecutive LiDAR time stamps (such as the k-th frame and the k+1-th frame) in the temporally and spatially synchronized IMU data is propagated using an integration algorithm, such as a 4th order Runge-Kutta (RK4) integration algorithm, a Euler integration algorithm, or a mean value integration algorithm, and is processed using a preset pre-integration method (for example, the method introduced by C. Forster, L. Carlone, F. Dellaert, and D. Scaramuzza, "IMU Preintegrati on on Manifold for Efficient Visual-Inertial Maximum-a-Posteriori Estimation," *Georgia Institute of Technology*, 2015) to obtain the offset pre-integration amount $\Delta p$, the velocity pre-integration amount $\Delta v$, and the rotation increment pre-integration amount $\Delta q$ which do not depend on an absolute pose.

In step 204, a state variable at a next time point is predicted, according to a jointly optimized state variable at a previous time point before a current time point in a preset sliding window and the temporally and spatially synchronized IMU data, to obtain predicted data of the state variable at the next time point.

In order to provide accurate initial values for subsequent LiDAR data correlation and subsequent joint optimization, the embodiment of the present disclosure requires a process such as step 204 to predict the state variable at the next time point.

A specific process is described as follows. The jointly optimized state variables $X1:m=[X1, X2, \ldots, Xm]$ at the previous time point before the current time point in the preset sliding window wherein $X_k=[p_k^T\ v_k^T\ q_k^T\ b_{a_k}^T\ b_{g_k}^T]^T$, and observation inputs $\hat{a}_k$, $\hat{\omega}_k$ of the IMU at the current time point are served as inputs. $X_{1:m}$ is a state variable array. $X_k$ is a k-th state variable where T represents a transpose of the matrix. Each state variable includes a translation vector $p_k$, a velocity vector $v_k$, a rotation matrix $q_k$, an IMU accelerometer bias $b_{a_k}$, and an IMU gyroscope bias $b_{g_k}$. $\hat{a}_k$ is a k-th acceleration observed by the IMU. $\hat{\omega}_k$ is a k-th angular velocity observed by the IMU.

As such, the known observation noise model of the IMU includes the following formulas (1) and (2):

$$\hat{\omega}_k = \omega_k + b_{g_k} + n_{g_k} \tag{1}$$

$$\hat{a}_k = a_k - R_k^T \cdot g + b_{a_k} + n_{a_k} \tag{2}$$

$R_k$ represents a rotation matrix of the IMU relative to a world coordinate system $\mathcal{F}_W$ at a k-th time point.

Therefore, the state variable at the next time point (the next frame) can be efficiently predicted via the above-mentioned inputs. The formulas are shown in formulas (3) and (4):

$$p_{k+1} = p_k + v_k \cdot \Delta t + 1/2[R_k \cdot (\hat{a}_k - \overline{b}_a)] \Delta t^2 \tag{3}$$

$$q_{k+1} = q_k \otimes \lfloor \hat{\omega}_k - \overline{b}_g \rfloor_\times \tag{4}$$

$\hat{p}_{k+1}$ is a predicted value of a translation vector of a k+1-th frame. $\hat{q}_{k+1}$ is a predicted value of a rotation matrix of the k+1-th frame. $\otimes$ represents a quaternion multiplication operation.

$$\lfloor \omega \rfloor_\times = \begin{bmatrix} 0 & -\omega_z & \omega_y \\ \omega_z & 0 & -\omega_x \\ -\omega_y & -\omega_x & 0 \end{bmatrix}$$

and $\overline{b}_g$, $\overline{b}_a$ are average values of two biases of the state variables in first m frames in the sliding window. Since biases of the gyroscope and the accelerometer at discrete time points are zero-mean random Gaussian white noises, the average values of multi-frame biases can reduce influence of abnormal biases and make the predicted state variables smoother.

In step 205, the predicted data of the state variable at the next time point is used to perform de-distortion processing on the temporally and spatially synchronized point cloud data.

That is, the point cloud data can be constrained via the predicted data of the state variable at the next time point, so that the de-distortion processing can be performed on the temporally and spatially synchronized point cloud data.

In step 206, a line feature extraction and a surface feature extraction are performed on the de-distortion processed point cloud data to obtain line feature data and surface feature data.

A detailed process of performing the line feature extraction and the surface feature extraction on the de-distortion processed point cloud data can be referred to the article "J. Zhang and S. Singh, "LOAM: Lidar Odometry and Mapping in Real-time," in Robotics: Science and Systems, 2014, vol. 2." and is not repeated herein.

In step 207, line feature constraint relationship data and surface feature constraint relationship data are obtained by performing a registration on the line feature data and pre-generated line features in a feature map and performing a registration on the surface feature data and pre-generated surface features in the feature map.

The line feature constraint relationship data includes points in the line feature data and corresponding points in the line features in the feature map, and the surface feature constraint relationship data includes points in the surface feature data and corresponding points in the surface features in the feature map.

In step 208, a linear velocity in a forward direction, a linear velocity in a horizontal direction, and a yaw angular velocity in the IMU coordinate system are determined by inputting the temporally and spatially synchronized wheel speed data of the movable object into a preset vehicle dynamics model.

For example, the preset vehicle dynamics model can adopt an Ackerman kinematics model but is not limited thereto.

In step 209, state information at each time point before the current time point in the preset sliding window is obtained.

The state information can include state variables. Each of the state variables includes a translation vector, a velocity vector, a rotation matrix, an IMU accelerometer bias, and an IMU gyroscope bias.

It is noted that before the joint optimization starts, the movable object may be in a stationary state or in a moving state. When the movable object starts to move from the stationary state, an initialization is required before the joint optimization. A specific initialization process is mainly for an initial velocity, a gravity vector g, a gyroscope bias $b_g$, and an accelerometer bias $b_a$. When it is considered that gravitational acceleration and the accelerometer bias are coupled together, it is difficult to completely decouple for the short-term initialization process. Accordingly, an initialization scheme herein focuses on estimating the initial velocity, the gravity vector g, and the gyroscope bias $b_g$.

Figure 3:
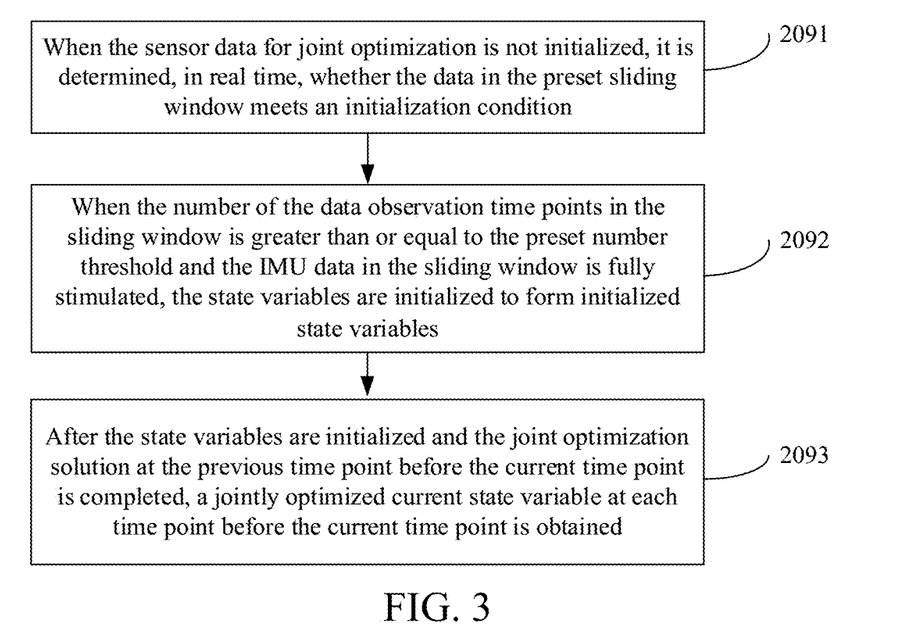
FIG. 3 illustrates a sub-step of an embodiment of the present disclosure.

Step 209 is shown in FIG. 3 and includes the following steps.

In step 2091, when the sensor data for joint optimization is not initialized, it is determined, in real time, whether the data in the preset sliding window meets an initialization condition.

The initialization condition includes that a number of data observation time points in the sliding window is greater than or equal to a preset number threshold, and the IMU data in the sliding window is fully stimulated.

Herein, the IMU data being fully stimulated refers to determining a variance of readings of the IMU observation data within a preset time interval. When the variance is greater than or equal to a preset threshold value, it represents that the IMU data is fully stimulated. Otherwise, when the variance is smaller than the preset threshold value, it represents that the IMU data is not fully stimulated.

In step 2092, when the number of the data observation time points in the sliding window is greater than or equal to the preset number threshold and the IMU data in the sliding window is fully stimulated, the state variables are initialized to form initialized state variables.

Furthermore, when the number of the data observation time points in the sliding window is less than the preset threshold number and the IMU data in the sliding window is fully stimulated, it is necessary to perform a tightly coupled inter-frame optimization on the point cloud data and the wheel speed data of the movable object in a current sliding window to obtain an initialized LiDAR pose at the current time point in the current sliding window. The initialized LiDAR pose includes a LiDAR rotation matrix and a LiDAR translation vector. The process is described as follows. First, based on the wheel speedometer combined with the assumption of a uniform motion model, an initial inter-frame motion prediction $\hat{T}_{k+1}^{k}$ (the wheel speedometer combined with the uniform speed model provides a rough linear velocity, and the IMU provides an angular velocity with a bias) is provided to perform inter-frame registration and pose optimization on LiDAR line features and LiDAR surface features between adjacent frames. An optimization objective of the inter-frame pose includes a geometric error based on the line features and the surface features and an offset constraint based on the observation data of the wheel speedometer and is shown in the following formula (5):

$$T_{k+1}^{k} = \sum_{i \in e_{\varepsilon}} \|r_{e_{\varepsilon}}(Z_i, X_k)\|_{\Sigma_{k+1}^{\varepsilon_k}}^{2} + \sum_{j \in e_s} \|r_{e_s}(Z_j, X_k)\|_{\Sigma_{s_{k+1}}^{s_k}}^{2} + \|r_{odom}(V_k, X_k)\|_{\Sigma_{V_{k+1}}^{V_k}}^{2}. \quad (5)$$

$r_{e_{\varepsilon}}(Z_j, X_k)$ represents a geometric residual error of the registration of the LiDAR line features in the k-th frame in the sliding window. $r_{e_s}(Z_j, X_k)$ represents a geometric residual error of the registration of the LiDAR surface features in the k-th frame in the sliding window. $r_{odum}(V_j, X_k)$ represents an offset constraint based on the observation data of the wheel speedometer and is shown in the following formula (6):

$$r_{odom}(V_k, X_k) = p_{k+1}^{k} - [V_k]_{4:6} \Delta t = (p_{k+1} - R_{k+1} R_k^T p_k) - [v_k]_{4:6} \Delta t \quad (6).$$

$p_{k+1}^{k}$ represents a relative offset between adjacent frames. $(R_k, p_k)$ represents a rotation matrix and a translation vector of a pose of the k-th frame. $[V_k]_{4:6} = [v_x \ v_y \ 0]^T$ represents a sub-vector composed of 4 to 6 columns of an augmented velocity vector $V_k$.

As such, after the relative pose $T_{k+1}^{k}$ of each frame is obtained by the above-mentioned formula (5) and the relative pose $T_{k+1}^{k}$ is converted into a LiDAR coordinate system $\mathcal{F}_{i_0}$ in a first frame in the sliding window, a series of initialization LiDAR poses $(R_k^{l_0}, p_k^{l_0})$ k=1, . . . , m are obtained.

Step 2092 can be implemented in the following method.

In step (1), consistency constraints of rotation change of the LiDAR between adjacent frames and a pre-integration amount of rotation increment of the LiDAR between the adjacent frames are adopted, according to the initialized LiDAR poses at the current time point and at each time point before the current time point, to accumulate the consistency constraints of consecutive multiple frames to obtain an initialized gyroscope bias.

Herein, the consistency constraints of the rotation change $\Delta q_l$ of the LiDAR between the adjacent frames and the pre-integration amount $\Delta q$ of the rotation increment of the LiDAR between the adjacent frames can be adopted to construct an optimization problem. The consistency constraints of the consecutive multiple frames can be added together to solve the initial gyroscope bias. As such, the solved initial gyroscope bias can be used to re-transmit the pre-integration amount to decrease an accumulated error caused by the gyroscope bias. The solved initial gyroscope bias can be obtained by the following formula (7):

$$\delta b_g = \underset{\delta b_g}{\mathrm{argmin}} \sum_{k \in \mathcal{B}} \left\| (q_b^l)^T \otimes (q_{l_{k+1}}^w)^T \otimes q_{k_l}^2 \otimes q_b^l \otimes (\Delta \hat{q}_{b_{k+1}}^{b_k})^T \otimes \begin{bmatrix} 1 \\ \frac{1}{2} J_{b_g}^q \delta b_g \end{bmatrix} \right\|^2. \quad (7)$$

$\mathcal{B}$ represents a number of frames in the sliding window. $J_{b_g}^{q}$ is a Jacobian matrix of the rotation increment $\Delta \hat{q}_{b_{k+1}}^{b_k}$ in the pre-integration with respect to the gyroscope bias $b_g$. $q_b^l$ is a quaternion form of a rotation component of an external parameter matrix from the IMU coordinate system $\mathcal{F}_B$ to the LiDAR coordinate system $\mathcal{F}_L$. $q_{l_k}^w$ represents a quaternion form of a rotation matrix of the k-th frame of the LiDAR.

In step (2), gravitational acceleration in the LiDAR coordinate system is obtained according to the initialized LiDAR poses in the current sliding window and the consistency constraints of the offset pre-integration amount, and the gravitational acceleration in the LiDAR coordinate system is converted into the world coordinate system to obtain an initialized gravitational acceleration.

The process of obtaining the initial gravitational acceleration is described in detail combining the following formulas and the specific derivation process.

The estimation of the gravitational acceleration mainly uses scale consistency constraints of the LiDAR poses obtained from the registration of the LiDAR and the pre-integration amount of the offset increment $\Delta p$. The pre-integrated amount has the following relationship as shown in formula (8):

$$\Delta p_{b_{k+1}}{}^{b_k} = R_{l_o}{}^{b_k}(p_{b_{k+1}}{}^{l_0} - p_{b_k}{}^{l_0} + 1/2 g^{l_0} \Delta t^2 - R_{b_k}{}^{l_0} v_{b_k}{}^{b_k} \Delta t_k) \quad (8).$$

In order to make the derivation process clearer, $\Delta t_k$ is used as a time difference between the k-frame and the k+1-th frame. $p_{b_k}{}^{l_0}$, $R_{b_k}{}^{l_0}$, $v_{b_k}{}^{b_k}$, $\Delta v_{b_{k+1}}{}^{b_k}$, $\Delta p_{b_{k+1}}{}^{b_k}$ are respectively abbreviated as $p_k$, $R_k$, $v_k$, $\Delta V_k$, and $\Delta p_k$. Accordingly, the above-mentioned formula (8) can be denoted as the formula (9):

$$p_{k+1} = p_k + R_k v_k \Delta t - 1/2 g^{l_0} \Delta t^2 + R_k \Delta P_k \quad (9).$$

Then, three consecutive frames (subscripts 1, 2, and 3 are used to indicate the consecutive three frames) have the following relationship as shown in the formula (10):

$$(p_2-p_1)\Delta t_2 = (R_1 v_1 t \Delta_1 - 1/2 g^{l_0} \Delta t_1^2 + R_1 \Delta p_1)\Delta t_2$$

$$(p_3-p_2)\Delta t_{21} = (R_2 v_2 \Delta t_2 - 1/2 g^{l_0} \Delta t_2^2 + R_2 \Delta p_2)\Delta t_1 \quad (10).$$

The relationship of the formula (11) can be obtained via the formulas (9) and (10):

$$\Delta v_k = R_k{}^T R_{k+1} v_{k+1} - v_k + R_k{}^T g^{l_0} \Delta t \quad (11).$$

An equivalent relationship of the following formula (12) can be obtained by performing a subtraction on the upper and lower formulas of the above-mentioned formula (10) and combining the above-mentioned formula (11):

$$\lambda(k) g^{l_0} = \beta(k) \quad (12).$$

The formula (12) has the flowing relationships of the formulas (13) and (14):

$$\lambda(k) = 1/2 R_k{}^T \Delta t_k \Delta t_{k+1} (\Delta t_k + \Delta t_{k+1}) \quad (13) \text{ and}$$

$$\beta(k) = R_k{}^T (R_{k+1} \Delta p_{k+1} \Delta t_k - (p_{k+2}-p_{k+1})\Delta t_k + (p_{k+1}-p_k)\Delta t_{k+1}) - \Delta p_k \Delta t_{t+1} + \Delta v_k \Delta t_k \Delta t_{k+1} \quad (14).$$

It can be understood that in the above-mentioned formula (12), variables except for the gravitational acceleration $g^{l_0}$ are all known. $R_k$ and $p_k$ are obtained by performing the external parameter conversion via the solved initial LiDAR poses. m−2 sets of constraint relationships (k=1, . . . , m−2) of the formulas (12) can be constructed by combining the formulas (12) to (14) in the sliding window formed by consecutive m (m≥3) frames. A nonlinear equation (for example, the equation is: $A_{3(m-2)\times 3} \cdot X_{3\times 1} = b_{3(m-2)\times 1}$) is constructed by the above-mentioned m−2 sets of constraint relationships, and a singular value decomposition (SVD) operation is performed to obtain the gravitational acceleration g in the LiDAR coordinate system $\mathcal{F}_{l_0}$.

After the gravitational acceleration g' in the LiDAR coordinate system $\mathcal{F}_{l_0}$ is obtained, the gravitational acceleration g^ in the LiDAR coordinate system $\mathcal{F}_{l_0}$ has to be converted into the world coordinate system. When it is considered the constraint of the magnitude G=9.81 of the gravitational acceleration g and the existing gravity parameterization method, the magnitude of the above-mentioned estimated gravitational acceleration g^ in the LiDAR coordinate system $\mathcal{F}_{l_0}$ can be normalized as $\hat{g}_W = \hat{g}/\|\hat{g}\|$. A normalized vector in the IMU coordinate system (inertial reference system) $\mathcal{F}_B$ is defined as $\hat{g}_I = [0, 0, -1]$. The gravity vector $\hat{g}_W$ is decomposed to the inertial reference system to obtain a final gravitational acceleration $g_W = R_{WI} \hat{g}_I G$ which is served as the initial gravitational acceleration, where $R_{WI} = \text{Exp}(\hat{v}\theta)$, $$\hat{v} = \frac{\hat{g}_I \times \hat{g}_W}{\|\hat{g}_I \times \hat{g}_W\|},$$

$\theta = \text{a tan} 2(\|\hat{g}_I \times \hat{g}_W\|, \hat{g}_I \cdot \hat{g}_W)$, and Exp represents an exponential mapping.

In step (3), an initialized velocity is determined by estimating an initial velocity vector according to the initialized gyroscope bias and the initialized gravitational acceleration.

Herein, after the initial gyroscope bias and the initial gravitational acceleration are obtained, the initial velocity can be solved. The specific process can be shown in the following formula (15):

$$v_k = \begin{cases} \frac{(p_{k+1}-p_k)}{\Delta t_k} - \frac{1}{2}(g_W + R_k \hat{a}_k)\Delta t & k < m \\ v_{k-1} + g_W \Delta t + R_{k-1} \hat{a}_{k-1} \Delta t & k = m \end{cases} \quad (15)$$

That is, when k<m, the initial vector can be obtained from the above-mentioned formula (15). When k=m, the initial vector only can be solved by performing two integral operations on a vector of a previous frame combining an acceleration model since there is no observation at a time point $t_{k+1}$.

In step 2093, after the state variables are initialized and the joint optimization solution at the previous time point before the current time point is completed, a jointly optimized current state variable at each time point before the current time point is obtained.

That is, the initialized state variable or the jointly optimized current state variable at each time point before the current time point in the sliding window can be obtained via the above-mentioned step 209. The difference between the initial state variable and the current state variable is that the initial state variable only can be obtained by performing the initial operation because no joint optimization is performed at each time point before the current time point in the sliding window. Because the joint optimization is performed at each time point before the current time point in the sliding window, the jointly optimized current state variable at each time point can be obtained. Therefore, based on the above-mentioned two corresponding situations, the following step 210 can include two methods.

In step 210, a current pose state of the movable object is determined by performing a joint optimization solution according to the sensor data for joint optimization and the state information at each time point before the current time point in the sliding window.

As mentioned above, step 210 can be implemented in the following two methods.

For example, when no joint optimization is performed at each time point before the current time point in the sliding window, the state variable at each time point in the sliding window is determined by adopting a joint probability density estimation according to the initialized state variable at each time point before the current time point and the sensor data for joint optimization. The state variable at the current time point in the sliding window is used for representing the current pose state of the movable object.

For another example, when the joint optimization is performed at each time point before the current time point in the sliding window, the state variable at each time point in the sliding window is determined by adopting a joint probability density estimation according to the jointly optimized current state variable at each time point before the current time point and the sensor data for joint optimization. The state variable at the current time point in the sliding window are used for representing the current pose state of the movable object.

Herein, an optimization framework adopted in the joint optimization is a sliding window structure based on fixed-lag smoothing. The fixed-lag smoothing is an iterative algorithm in which updating operations and marginalized operations of new observations or state variables are alternately performed, and estimations of full probability density of the recent m state variables recursively maintain. The fixed-lag smoothing is an incremental state estimation method based on a graphical model. From the perspective of factor graphs, the fixed-lag smoothing can be understood as solving a maximum posterior probability to obtain multiple decomposed factors of conditional probabilities and likelihood probabilities and multiplying the decomposed factors, and can effectively perform incremental solutions. As such, while more observational information maintains, the computational complexity of incremental target optimization is reduced.

Figure 4:
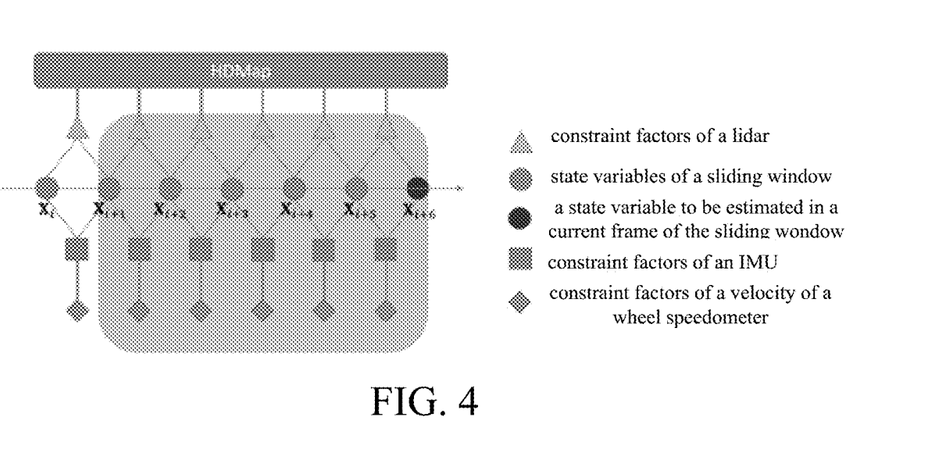
FIG. 4 illustrates a jointly optimized sliding window according to an embodiment of the present disclosure.

As shown in the example in FIG. 4, a size of the sliding window is 5 (but is not limited thereto). When the system is in a stable state, at any given time point, the joint density of five most recent state variables can be obtained. When a state variable for a next time point $X_{i+6}$ is added, the variable (the state variable $X_{i+1}$) which lags for the longest time in the sliding window can be marginalized. Joint state estimation can be performed on the 4 variables $X_{i+2}$, $X_{i+3}$, $X_{i+4}$, $X_{i+5}$, and the new state variable $X_{i+6}$. A high definition (HD) map represents a preset feature map. Herein, the HD map is an HD point cloud feature map.

In the two implementation methods in the above-mentioned step 210, the state variable at each time point in the sliding window is determined by adopting the joint probability density estimation and can be implemented in the following method.

The state variable $X_k$ at each time point in the sliding window is determined according to a joint probability density estimation function:

$$X^* = \underset{X}{\mathrm{argmin}}$$

$$\left\{ \|r_p(X)\|^2 + \sum_{k \in \mathcal{B}} \left( \sum_{i \in \mathcal{C}_\mathcal{E}} \|r_{\mathcal{C}_\mathcal{E}}(Z_i, X_k)\|^2_{\Sigma^{Msp}_{\mathcal{C}_\mathcal{E}}} + \sum_{j \in \mathcal{C}_S} \|r_{\mathcal{C}_S}(Z_j, X_k)\|^2_{\Sigma^{Msp}_{\mathcal{C}_S}} \right) + \sum_{k \in \mathcal{B}} \|r_\mathcal{B}(Z^{B_k}_{B_{k+1}}, X)\|^2_{\Sigma^{B_k}_{B_{k-1}}} + \sum_{k \in \mathcal{B}} \|r_V(Z^{V_k}_{V_{k+1}}, X)\|^2_{\Sigma^{V_k}_{V_{k+1}}} \right\}$$

k represents the k-th time point and the k-th frame. $r_p(X)$ represents a marginalized prior item. $\mathcal{B}$ represents a total number of frames in the sliding window. i represents the i-th line feature. j represents the j-th surface feature. $\mathcal{C}_\mathcal{E}$ represents a total number of the line feature pairs in line feature constraint relationship data. $\mathcal{C}_S$ represents a total number of the surface feature pairs in surface feature constraint relationship data. $r_{\mathcal{C}_\mathcal{E}}(Z_i, Z_k)$ represents a geometric residual error of the registration of the LiDAR line features in the k-th frame in the sliding window. $Z_i$ represents the i-th line feature observation. $\Sigma^{map}_{\mathcal{C}_\mathcal{E}}$ represents an observation covariance of a current LiDAR line feature. $r_{\mathcal{C}_S}(Z_j, X_k)$ represents a geometric residual error of the registration of the LiDAR surface features in the k-th frame in the sliding window. $Z_j$ represents the j-th surface feature observation. $\Sigma^{map}_{\mathcal{C}_\mathcal{E}}$ represents an observation covariance of a current LiDAR surface feature. $r_\mathcal{B}(Z_{B_{k+1}}^{B_k}, X)$ represents a residual error of the IMU. $Z_{B_{k+1}}^{B_k}$ represesnts an IMU observation from the k-th frame to the k+1-th frame in the IMU coordinate system. $\Sigma_{B_{k+1}}^{B_k}$ represents a covariance matrix of a pre-ingeration amount corresponding to the IMU. $r_V(Z_{V_{k+1}}^{V_k}, X)$ represents a residual error of constraints of some state variables by the wheel speedometer. $Z_{V_{k+1}}^{V_k}$ represents an wheel speedometer observation from the k-th frame to the k+1-th frame in the wheel speedometer coordinate system. $\Sigma_{V_{k+1}}^{V_k}$ represents a covariance of the wheel speedometer observation.

$r_{\mathcal{C}_\mathcal{E}}(Z_i, X_k)$ is expressed as:

$r_{\mathcal{C}_\mathcal{E}}(p_i, R_k, p_k) = \lfloor p_2 - p_1 \rfloor_x \cdot (R_k p_i + p_k - p_1)$.

$r_{\mathcal{C}_S}(Z_j, X_k)$ is expressed as:

$r_{\mathcal{C}_S}(p_j, R_k, p_k) = n^T \cdot (R_k p_j + p_k)$.

$r_\mathcal{B}(Z_{B_{k+1}}^{B_k}, X)$ is expressed as:

$$r_\mathcal{B}(Z_{B_{k+1}}^{B_k}, X) = \begin{bmatrix} R_k^T \left( p_{k+1} - p_k - v_k \Delta t - \frac{1}{2} g_W \Delta t^2 \right) - \Delta p \\ R_k^T (v_{k+1} - v_k - g_W \Delta t) - \Delta v \\ 2[\Delta q^{-1} \otimes q_k^{-1} \otimes q_{k+1}]_{xyz} \\ b_{a_{k+1}} - b_{a_k} \\ b_{g_{k+1}} - b_{g_k} \end{bmatrix}$$

$r_V(Z_{V_{k+1}}^V, X)$ is expressed as:

$r_V = (v_i - R_k^T [V_i]_{4:6})$.

$p_i$ represents a line feature point to be registered. $p_1$ and $p_2$ represents two points of a line feature in the feature map. $R_k$ and $p_k$ respectively represent the rotation matrix and the translation vector in the state variable $X_k$ of the k-th frame. p, represents a surface feature point to be registered. n represents a plane normal vector in the feature map. $v_k$ represents an initialized vector in the state variable $X_k$ of the k-th frame. $\Delta t$ represents a time interval between two adjacent frames. $g_W$ represents an initialized gravitational acceleration. $\Delta p$ represents an offset pre-integration amount. $\Delta v$ represents a velocity pre-integration amount. $\Delta q$ represents a rotation increment pre-integration amount. $q_k$ represents a quaternion representation of the rotation matrix $R_k$ in the state variable $X_k$ of the k-th frame. $[\bullet]_{xyz}$ represents a real part of a quaternion. $b_{ak}$ represents the IMU accelerometer bias in the state variable $X_k$ of the k-th frame. $b_{gk}$ represents the gyroscope bias in the state variable $X_k$ of the k-th frame. $v_i$ represents a matrix of a line vector vDx in a forward direction, a line vector $v_y$ in a horizontal direction, and a yaw angular vector $\theta$ in the IMU coordinate system:

$$v_i = [0\ 0\ 0\ v_x\ v_y\ 0\ 0\ 0\ \theta\ 0\ 0\ 0\ 0\ 0]^T.$$

The positioning method based on multi-sensor fusion provided by the embodiments of the present disclosure can determine the current pose state of the movable object. In the process of researching the present disclosure, the inventor considers the following situation. Although the cost of a visual sensor (a camera) is relatively low, an error of observation data and accuracy of data correlation in most outdoor scenes of autonomous driving cannot be guaranteed due to effect of exposure and light. Moreover, a monocular camera lacks scale information. A LiDAR sensor is less affected by light changes, has a high data accuracy within a limited range (an observation error within 200 meters tends to a centimeter level), and includes three-dimensional structural information. Accordingly, the LiDAR sensor has strong practical value in positioning and mapping in the field of autonomous driving. An IMU is a sensor which measures angular velocities of three axes and acceleration of an object and can provide pose observation data in six degrees of freedom. The IMU is an active sensor, is not limited to difference of scenes, and is an indispensable component in applications of robots, UAVs, and unmanned vehicles. However, the IMU has disadvantage that observability of a system is affected under some special motion conditions (uniform speed or uniform acceleration motion), especially in autonomous driving applications, a motion state of a vehicle approximates to a uniform motion on a plane. At this time, the observability of the IMU is often affected. A wheel speedometer can provide an inter-frame plane velocity vector and an inter-frame distance scale measurement at low frequencies. Therefore, the embodiments of the present disclosure adopting the fusion of the wheel speedometer and the IMU can compensate for the disadvantage that the observability of the IMU is affected when the IMU moves at a uniform speed in an approximate plane.

In the embodiments of the present disclosure, the LiDAR, the IMU, and the wheel speedometer are fully fused and combined with the pre-generated point cloud feature map. As such, positioning and state estimation of a movable object (such as a vehicle or an intelligent robot) can be accurately and robustly executed. Furthermore, the entire joint optimization framework can be well compatible with newly added sensor observation sources including absolute observation data, such as GPS/RTK and inter-frame motions and observation constraints provided by the camera. That is, after the new sensor observation sources are newly added, the joint optimization still can be performed in the embodiments of the present disclosure.

Figure 5:
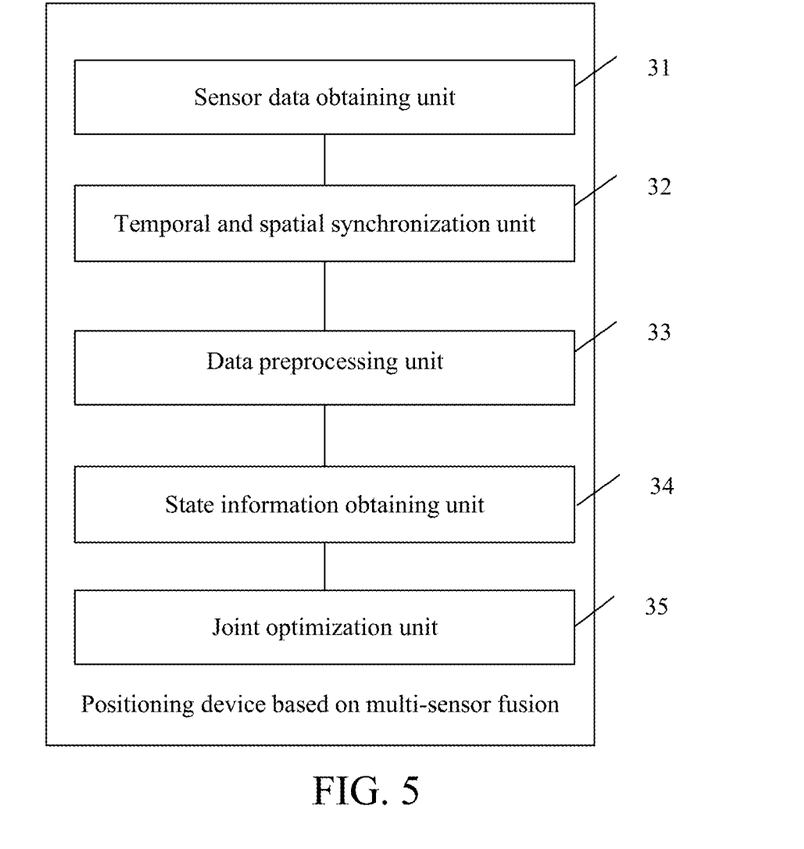
FIG. 5 illustrates a structural block diagram of a positioning device based on multi-sensor fusion provided by an embodiment of embodiment of the present disclosure.

Furthermore, as shown in FIG. 5, an embodiment of the present disclosure provides a positioning device based on multi-sensor fusion applied to an object equipped with various sensors. The positioning device based on multi-sensor fusion includes a sensor data obtaining unit 31, a temporal and spatial synchronization unit 32, a data preprocessing unit 33, a state information obtaining unit 34, and a joint optimization unit 35.

The sensor data obtaining unit 31 is configured to obtain sensor data collected by the various sensors equipped on the movable object in real time.

The time and space synchronization unit 32 is configured to temporally and spatially synchronize the sensor data collected by the various sensors to form various temporally and spatially synchronized sensor data.

The data preprocessing unit 33 is configured to perform data preprocessing and data correlation on the various temporally and spatially synchronized sensor data to form sensor data for joint optimization.

The state information obtaining unit 34 is configured to obtain state information at each time point before a current time point in the preset sliding window.

The joint optimization unit 35 is configured to determine a current pose state of the movable object by performing a joint optimization solution according to the sensor data for joint optimization and the state information at each time point before the current time point in the sliding window.

Furthermore, an embodiment of the present disclosure further provides a computer-readable storage medium including a program or instructions. The program or instructions when executed by a computer, implement the positioning methods based on multi-sensor fusion in FIG. 1 to FIG. 3. Detailed implementing processes can be referred to the embodiments of the above-mentioned methods and are not repeated herein.

Furthermore, an embodiment of the present disclosure further provides a computer program product. The computer program product when executed by a computer, causes the computer to implement the positioning methods based on multi-sensor fusion in FIG. 1 to FIG. 3. Detailed implementing processes can be referred to the embodiments of the above-mentioned methods and are not repeated herein.

Furthermore, an embodiment of the present disclosure further provides a server including a memory and one or more processors communicatively connected to the memory. The memory stores instructions executable by the one or more processors. The instructions when executed by the one or more processors, causes the one or more processors to implement the positioning methods based on multi-sensor fusion in FIG. 1 to FIG. 3. Detailed implementing processes can be referred to the embodiments of the above-mentioned methods and are not repeated herein.

The embodiments of the present disclosure provide a positioning method and device based on multi-sensor fusion. First, sensor data collected by various sensors equipped on a movable object is obtained in real time. The sensor data collected by the various sensors is temporally and spatially synchronized to form various temporally and spatially synchronized sensor data. Data preprocessing and data correlation are performed on the various temporally and spatially synchronized sensor data to form to-be-jointly-optimized sensor data. Then, state information at each time point before a current time point in a preset sliding window is obtained. A current pose state of the movable object is determined by performing a joint optimization solution according to the to-be-jointly-optimized sensor data and the state information at each time point before the current time point in the sliding window. It can be seen that the present disclosure can combine various sensor data, process the various sensor data via a sliding window, and updates the state information at the current time point in real time. Accordingly, the movable object can be accurately positioned in a scenario where GPS signals are lost, in a jumping scenario, or in a scenario where a LiDAR observation is degraded seriously.

A person skilled in the art should understand that the embodiments of the present disclosure can be provided as a method, a system, or a computer program product. Therefore, the present disclosure can use a form of hardware only embodiments, software only embodiments, or embodiments with a combination of software and hardware. Moreover, the present disclosure can use a form of a computer program product which is implemented on one or more computer-usable storage media (including but not limited to a disk memory, a compact disc read-only memory (CD-ROM), an optical memory, or the like) which include computer-usable program codes.

The present disclosure is described with reference to the flowcharts and/or block diagrams of the method, the apparatus (device), and the computer program product according to the embodiments of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions can also be stored in a computer-readable memory which can instruct the computer or any other programmable data processing device to work in a specific manner, so that the instructions stored in the computer-readable memory generate an artifact which includes an instruction apparatus. The instruction apparatus implements a specific function in one or more processes in the flowcharts and/or in one or more blocks in the block diagrams.

These computer program instructions can also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Specific examples are used in this specification to describe the principle and implementation manners of the present disclosure. The descriptions of the foregoing embodiments are merely intended to help understand the method and core idea of the present disclosure. In addition, a person skilled in the art may, according to the idea of the present disclosure, make modifications with respect to the specific implementation manners and the application scope. Therefore, the content of this specification shall not be construed as a limitation on the present disclosure.

What is claimed is:

1. A positioning method based on multi-sensor fusion, applied to a movable object equipped with various sensors, the method comprising:

obtaining sensor data collected by the various sensors equipped on the movable object in real time, comprising:
　obtaining IMU data measured by an IMU, wheel speed data of the movable object measured by a wheel speedometer, and point cloud data measured by a LiDAR in real time, wherein the various sensors comprise the IMU, the wheel speedometer, and the LiDAR, wherein the IMU comprises an accelerometer and a gyroscope;
temporally and spatially synchronizing the sensor data collected by the various sensors to form various temporally and spatially synchronized sensor data;
performing data preprocessing and data correlation on the various temporally and spatially synchronized sensor data to form to-be-jointly-optimized sensor data;
obtaining state information at each time point before a current time point in a preset sliding window comprising:
initializing state variables to form initialized state variables, wherein the state information comprises the state variables, and each of the state variables comprises a translation vector, a velocity vector, a rotation matrix, an IMU accelerometer bias, and an IMU gyroscope bias; and
determining a current pose state of the movable object by performing a joint optimization solution according to the to-be-jointly-optimized sensor data and the state information at each time point before the current time point in the preset sliding window, comprising:
　determining the state variable at each time point in the preset sliding window by adopting a joint probability density estimation according to the initialized state variable at each time point before the current time point and the to-be-jointly-optimized sensor data, in response to no joint optimization being performed at each time point before the current time point in the preset sliding window, wherein the state variable at the current time point in the preset sliding window is used for representing the current pose state of the movable object; and
　determining the state variable at each time point in the preset sliding window by adopting the joint probability density estimation according to the jointly optimized current state variable at each time point before the current time point and the to-be-jointly-optimized sensor data, in response to the joint optimization being performed at each time point before the current time point in the preset sliding window, wherein the state variable at the current time point in the preset sliding window is used for representing the current pose state of the movable object.

2. The method of claim 1,
wherein the obtaining the state information at each time point before the current time point in the preset sliding window further comprises:
determining, in real time, whether data in the preset sliding window meets an initialization condition in response to the to-be-jointly-optimized sensor data being not initialized, wherein the initialization condition comprises that a number of data observation time points in the preset sliding window is greater than or equal to a preset number threshold, and IMU data in the preset sliding window is fully stimulated, wherein the initializing the state variables to form the initialized state variables is in response to the number of the data observation time points in the preset sliding window being greater than or equal to the preset number threshold and the IMU data in the preset sliding window is fully stimulated; and in response to initializing the state variables and in response to the joint optimization solution at a previous time point before the current time point, obtaining a jointly optimized current state variable at each time point before the current time point.

3. The method of claim 2, wherein the temporally and spatially synchronizing the sensor data collected by the various sensors to form the various temporally and spatially synchronized sensor data comprises:

transforming the wheel speed data of the movable object and the point cloud data into an IMU coordinate system according to pre-calibrated external parameters of the IMU, the wheel speedometer, and the LiDAR, and aligning collection time of each frame of the wheel speed data of the movable object and the point cloud data to a time stamp of the IMU according to respective frame rates of data collection of the IMU, the wheel speedometer, and the LiDAR so that the time stamps of the IMU data, the wheel speed data of the movable object, and the point cloud data in the IMU coordinate system are aligned to each other.

4. The method of claim 2, wherein the performing the data preprocessing and the data correlation on the various temporally and spatially synchronized sensor data to form the to-be-jointly-optimized sensor data comprises:

propagating IMU data between two consecutive frames of LiDAR time stamps in temporally and spatially synchronized IMU data using a preset integration algorithm, and processing the IMU data between the two consecutive frames of LiDAR time stamps in the temporally and spatially synchronized IMU data using a preset pre-integration method to obtain an offset pre-integration amount, a velocity pre-integration amount, and a rotation increment pre-integration amount;

predicting a state variable at a next time point according to a jointly optimized state variable at the previous time point before the current time point in the preset sliding window and the temporally and spatially synchronized IMU data, to obtain predicted data of the state variable at the next time point;

performing de-distortion processing on temporally and spatially synchronized point cloud data using the predicted data of the state variable at the next time point;

performing a line feature extraction and a surface feature extraction on the de-distortion processed point cloud data to obtain line feature data and surface feature data;

obtaining line feature constraint relationship data and surface feature constraint relationship data by performing a registration on the line feature data and pre-generated line features in a feature map, and a registration on the surface feature data and pre-generated surface features in the feature map; and determining a linear velocity in a forward direction, a linear velocity in a horizontal direction, and a yaw angular velocity in an IMU coordinate system by inputting temporally and spatially synchronized wheel speed data of the movable object into a preset vehicle dynamics model.

5. The method of claim 4, further comprising:

performing a tightly coupled inter-frame optimization on the point cloud data and the wheel speed data of the movable object in a current sliding window to obtain an initialized LiDAR pose at the current time point in the current sliding window, in response to the number of data observation time points in the preset sliding window being less than the preset threshold number and the IMU data in the preset sliding window being fully stimulated, wherein the initialized LiDAR pose includes a LiDAR rotation matrix and a LiDAR translation vector; and wherein the initializing the state variables to form the initialized state variables comprises:

adopting consistency constraints of LiDAR rotation change between adjacent frames and a LiDAR rotation increment pre-integration amount between the adjacent frames according to the initialized LiDAR poses at the current time point and at each time point before the current time point, to accumulate the consistency constraints of consecutive multiple frames to obtain an initialized gyroscope bias;

obtaining gravitational acceleration in a LiDAR coordinate system according to the initialized LiDAR poses in the current sliding window and the consistency constraints of the offset pre-integration amount, and converting the gravitational acceleration in the LiDAR coordinate system into a world coordinate system to obtain an initialized gravitational acceleration; and determining an initialized velocity by estimating an initial velocity vector according to the initialized gyroscope bias and the initialized gravitational acceleration.

6. The method of claim 5, wherein the determining the state variable at each time point in the preset sliding window by adopting the joint probability density estimation comprises:

a state variable $X_k$ at each time point in the sliding window is determined according to a joint probability density estimation function:

$$X^* = \underset{X}{\mathrm{argmin}}$$

$$\left\{ \|r_p(X)\|^2 + \sum_{k \in \mathcal{B}} \left( \sum_{i \in C_\varepsilon} \|r_{C_\varepsilon}(Z_i, X_k)\|^2_{\Sigma_{C_\varepsilon}^{Msp}} + \sum_{j \in C_s} \|r_{C_s}(Z_j, X_k)\|^2_{\Sigma_{C_s}^{Msp}} \right) + \sum_{k \in \mathcal{B}} \|r_\mathcal{B}(Z^{B_k}_{B_{k+1}}, X)\|^2_{\Sigma^{B_k}_{B_{k-1}}} + \sum_{k \in \mathcal{B}} \|r_V(Z^{V_k}_{V_{k+1}}, X)\|^2_{\Sigma^{V_k}_{V_{k+1}}} \right\},$$

wherein k represents a k-th time point and a k-th frame, $r_p(X)$ represents a marginalized prior item, $\mathcal{B}$ represents a total number of frames in the preset sliding window, i represents the i-th line feature, j represents the j-th surface feature, $C_\varepsilon$ represents a total number of line feature pairs in line feature constraint relationship data, $C_S$ represents a total number of the surface feature pairs in surface feature constraint relationship data, $r_{C_\varepsilon}(Z_i, Z_k)$ represents a geometric residual error of the registration of the LiDAR line features in the k-th frame in the preset sliding window, $Z_i$ represents the i-th line feature observation, $\Sigma^{map}_{C_\varepsilon}$ represents an observation covariance of a current LiDAR line feature, $r_{C_s}(Z_j, X_k)$ represents a geometric residual error of the registration of LiDAR surface features in the k-th frame in the preset sliding window, $Z_j$ represents a j-th surface feature observation, $\Sigma^{map}_{C_\varepsilon}$ represents an observation covariance of a current LiDAR surface feature, $r_B(Z_{B_{k+1}}^{B_k}, X)$ represents a residual error of the IMU, $Z_{B_{k+1}}^{B_k}$ represesnts an IMU observation from the k-th frame to the k+1-th frame in the IMU coordinate system, $\Sigma_{B_{k+1}}^{B_k}$ represents a covariance matrix of a pre-ingeration amount corresponding to the IMU, $r_V(Z_{V_{k+1}}^{V_k}, X)$ represents a residual error of constraints of some state variables by the wheel speedometer, $Z_{V_{k+1}}^{V_k}$ represents an wheel speedometer observation from the k-th frame to the k+1-th frame in the wheel speedometer coordinate system, and $\Sigma_{V_{k+1}}^{V_k}$ represents a covariance of the wheel speedometer observation, wherein $r_{C_\varepsilon}(Z_i, X_k)$ is expressed as:

$$r_{C_\varepsilon(p_i,R_k,p_k)} = \lfloor p_2-p_1 \rfloor_{x} \cdot (R_k \cdot p_i + p_k - p_1),$$

$r_{C_S}(Z_j, X_k)$ is expressed as:

$$r_{C_S(p_j,R_k,p_k)} = n^T \cdot (R_k \cdot p_j + p_k),$$

$r_B(Z_{B_{k+1}}^{B_k}, X)$ is expressed as:

$$r_B(Z_{B_{k+1}}^{B_k}, X) = \begin{bmatrix} R_k^T\left(p_{k+1} - p_k - v_k \Delta t - \frac{1}{2} g_W \Delta t^2\right) - \Delta p \\ R_k^T(v_{k+1} - v_k - g_W \Delta t) - \Delta v \\ 2[\Delta q^{-1} \otimes q_k^{-1} \otimes q_{k+1}]_{xyz} \\ b_{a_{k+1}} - b_{a_k} \\ b_{g_{k+1}} - b_{g_k} \end{bmatrix}$$

and $r_V(Z_{V_{k+1}}^V, X)$ is expressed as: $r_V = (v_i - R_k \cdot [V_i]_{4:6})$, wherein $p_i$ represents a line feature point to be registered, $p_1$ and $p_2$ represents two points of a line feature in the feature map, $R_k$ and $p_k$ respectively represent the rotation matrix and the translation vector in the state variable $X_k$ of the k-th frame, $p_j$ represents a surface feature point to be registered, n represents a plane normal vector in the feature map, $v_k$ represents an initialized vector in the state variable $X_k$ of the k-th frame, $\Delta t$ represents a time interval between two adjacent frames, $g_W$ represents an initialized gravitational acceleration, $\Delta p$ represents an offset pre-integration amount, $\Delta v$ represents a velocity pre-integration amount, $\Delta q$ represents a rotation increment pre-integration amount, $q_k$ represents a quaternion representation of the rotation matrix $R_k$ in the state variable $X_k$ of the k-th frame, $[\cdot]_{xyz}$ represents a real part of a quaternion, $b_{a_k}$ represents the IMU accelerometer bias in the state variable $X_k$ of the k-th frame, $b_{g_k}$ represents the gyroscope bias in the state variable $X_k$ of the k-th frame, $v_i$ represents a matrix of a line vector $v_x$ in a forward direction, a line vector $v_y$ in a horizontal direction, and a yaw angular vector $\theta$ in the IMU coordinate system, $$v_i = [0\ 0\ 0\ v_x\ v_y\ 0\ 0\ 0\ \theta\ 0\ 0\ 0\ 0\ 0]^T.$$

7. A non-transitory computer-readable storage medium, comprising program instructions that, when executed by a processor of a computing device, causes the computing device to:

obtain sensor data collected by various sensors equipped on a movable object in real time comprises the program instructions when executed by the processor of the computing device, causes the computing device to obtain IMU data measured by an IMU, wheel speed data of the movable object measured by a wheel speedometer, and point cloud data measured by a LiDAR in real time, wherein the various sensors comprise the IMU, the wheel speedometer, and the LiDAR, wherein the IMU comprises an accelerometer and a gyroscope;

temporally and spatially synchronize the sensor data collected by the various sensors to form various temporally and spatially synchronized sensor data;

perform data preprocessing and data correlation on the various temporally and spatially synchronized sensor data to form to-be-jointly-optimized sensor data;

obtain state information at each time point before a current time point in a preset sliding window;

initialize state variables to form initialized state variables, wherein the state information comprises the state variables, and each of the state variables comprises a translation vector, a velocity vector, a rotation matrix, an IMU accelerometer bias, and an IMU gyroscope bias;

determine a current pose state of the movable object by performing a joint optimization solution according to the to-be-jointly-optimized sensor data and the state information at each time point before the current time point in the preset sliding window;

determine the state variable at each time point in the preset sliding window by adopting a joint probability density estimation according to the initialized state variable at each time point before the current time point and the to-be-jointly-optimized sensor data, in response to no joint optimization being performed at each time point before the current time point in the preset sliding window, wherein the state variable at the current time point in the preset sliding window is used for representing the current pose state of the movable object; and determine the state variable at each time point in the preset sliding window by adopting the joint probability density estimation according to the jointly optimized current state variable at each time point before the current time point and the to-be-jointly-optimized sensor data, in response to the joint optimization being performed at each time point before the current time point in the preset sliding window, wherein the state variable at the current time point in the preset sliding window is used for representing the current pose state of the movable object.

8. The non-transitory computer-readable storage medium of claim 7, wherein the program instructions when executed by the processor of the computing device, causes the computing device to obtain the state information at each time point before the current time point in the preset sliding window comprises the program instructions when executed by the processor of the computing device, causes the computing device to:

determine, in real time, whether data in the preset sliding window meets an initialization condition in response to the to-be-jointly-optimized sensor data being not initialized, wherein the initialization condition comprises that a number of data observation time points in the preset sliding window is greater than or equal to a preset number threshold, and IMU data in the preset sliding window is fully stimulated, wherein the program instructions when executed by the processor of the computing device, causing the computing device to initialize the state variables to form the initialized state variables, is in response to the number of the data observation time points in the preset sliding window being greater than or equal to the preset number threshold and the IMU data in the preset sliding window is fully stimulated; and in response to initializing the state variables and in response to the joint optimization solution at a previous time point before the current time point, obtain a jointly optimized current state variable at each time point before the current time point.

9. The non-transitory computer-readable storage medium of claim 8, wherein the program instructions when executed by the processor of the computing device, causes the computing device to temporally and spatially synchronize the sensor data collected by the various sensors to form the various temporally and spatially synchronized sensor data comprises the program instructions when executed by the processor of the computing device, causes the computing device to:

transform the wheel speed data of the movable object and the point cloud data into an IMU coordinate system according to pre-calibrated external parameters of the IMU, the wheel speedometer, and the LiDAR, and align collection time of each frame of the wheel speed data of the movable object and the point cloud data to a time stamp of the IMU according to respective frame rates of data collection of the IMU, the wheel speedometer, and the LiDAR so that the time stamps of the IMU data, the wheel speed data of the movable object, and the point cloud data in the IMU coordinate system are aligned to each other.

10. A computing device, comprising a memory and one or more processors communicatively connected to the memory;

wherein the memory stores instructions executable by the one or more processors, the instructions, when executed by the processors, causes the computing device to:

obtain sensor data collected by various sensors equipped on a movable object in real time comprises the instructions when executed by the processors, causes the computing device to:

obtain IMU data measured by an IMU, wheel speed data of the movable object measured by a wheel speedometer, and point cloud data measured by a LiDAR in real time, wherein the various sensors comprise the IMU, the wheel speedometer, and the LiDAR, wherein the IMU comprises an accelerometer and a gyroscope;

temporally and spatially synchronize the sensor data collected by the various sensors to form various temporally and spatially synchronized sensor data;

perform data preprocessing and data correlation on the various temporally and spatially synchronized sensor data to form to-be-jointly-optimized sensor data;

obtain state information at each time point before a current time point in a preset sliding window;

initialize state variables to form initialized state variables, wherein the state information comprises the state variables, and each of the state variables comprises a translation vector, a velocity vector, a rotation matrix, an IMU accelerometer bias, and an IMU gyroscope bias;

determine a current pose state of the movable object by performing a joint optimization solution according to the to-be-jointly-optimized sensor data and the state information at each time point before the current time point in the preset sliding window;

determine the state variable at each time point in the preset sliding window by adopting a joint probability density estimation according to the initialized state variable at each time point before the current time point and the to-be-jointly-optimized sensor data, in response to no joint optimization being performed at each time point before the current time point in the preset sliding window, wherein the state variable at the current time point in the preset sliding window is used for representing the current pose state of the movable object; and determine the state variable at each time point in the preset sliding window by adopting the joint probability density estimation according to the jointly optimized current state variable at each time point before the current time point and the to-be-jointly-optimized sensor data, in response to the joint optimization being performed at each time point before the current time point in the preset sliding window, wherein the state variable at the current time point in the preset sliding window is used for representing the current pose state of the movable object.

11. The computing device of claim 10, wherein the instructions when executed by the processors, causes the computing device to obtain the state information at each time point before the current time point in the preset sliding window comprises the instructions when executed by the processors, causes the computing device to:

determine, in real time, whether data in the preset sliding window meets an initialization condition in response to the to-be-jointly-optimized sensor data being not initialized, wherein the initialization condition comprises that a number of data observation time points in the preset sliding window is greater than or equal to a preset number threshold, and IMU data in the preset sliding window is fully stimulated, wherein the instructions when executed by the processor, causing the computing device to initialize the state variables to form the initialized state variables, is in response to the number of the data observation time points in the preset sliding window being greater than or equal to the preset number threshold and the IMU data in the preset sliding window is fully stimulated; and in response to initializing the state variables and in response to the joint optimization solution at a previous time point before the current time point, obtain a jointly optimized current state variable at each time point before the current time point.

12. The computing device of claim 11, wherein the instructions when executed by the processors, causes the computing device to temporally and spatially synchronize the sensor data collected by the various sensors to form the various temporally and spatially synchronized sensor data comprises the instructions when executed by the processors, causes the computing device to:

transform the wheel speed data of the movable object and the point cloud data into an IMU coordinate system according to pre-calibrated external parameters of the IMU, the wheel speedometer, and the LiDAR, and align collection time of each frame of the wheel speed data of the movable object and the point cloud data to a time stamp of the IMU according to respective frame rates of data collection of the IMU, the wheel speedometer, and the LiDAR so that the time stamps of the IMU data, the wheel speed data of the movable object, and the point cloud data in the IMU coordinate system are aligned to each other.

13. The computing device of claim 11, wherein the instructions when executed by the processors, causes the computing device to perform the data preprocessing and the data correlation on the various temporally and spatially synchronized sensor data to form the to-be-jointly-optimized sensor data comprises the instructions when executed by the processors, causes the computing device to:

propagate IMU data between two consecutive frames of LiDAR time stamps in temporally and spatially synchronized IMU data using a preset integration algorithm, and process the IMU data between the two consecutive frames of LiDAR time stamps in the temporally and spatially synchronized IMU data using a preset pre-integration method to obtain an offset pre-integration amount, a velocity pre-integration amount, and a rotation increment pre-integration amount;

predict a state variable at a next time point according to a jointly optimized state variable at the previous time point before the current time point in the preset sliding window and the temporally and spatially synchronized IMU data, to obtain predicted data of the state variable at the next time point;

perform de-distortion processing on temporally and spatially synchronized point cloud data using the predicted data of the state variable at the next time point;

perform a line feature extraction and a surface feature extraction on the de-distortion processed point cloud data to obtain line feature data and surface feature data;

obtain line feature constraint relationship data and surface feature constraint relationship data by performing a registration on the line feature data and pre-generated line features in a feature map, and a registration on the surface feature data and pre-generated surface features in the feature map; and determine a linear velocity in a forward direction, a linear velocity in a horizontal direction, and a yaw angular velocity in an IMU coordinate system by inputting temporally and spatially synchronized wheel speed data of the movable object into a preset vehicle dynamics model.

14. The non-transitory computer-readable storage medium of claim 8, wherein the program instructions when executed by the processor of the computing device, causes the computing device to perform the data preprocessing and the data correlation on the various temporally and spatially synchronized sensor data to form the to-be-jointly-optimized sensor data comprises the program instructions when executed by the processor of the computing device, causes the computing device to:

propagate IMU data between two consecutive frames of LiDAR time stamps in temporally and spatially synchronized IMU data using a preset integration algorithm, and process the IMU data between the two consecutive frames of LiDAR time stamps in the temporally and spatially synchronized IMU data using a preset pre-integration method to obtain an offset pre-integration amount, a velocity pre-integration amount, and a rotation increment pre-integration amount;

predict a state variable at a next time point according to a jointly optimized state variable at the previous time point before the current time point in the preset sliding window and the temporally and spatially synchronized IMU data, to obtain predicted data of the state variable at the next time point;

perform de-distortion processing on temporally and spatially synchronized point cloud data using the predicted data of the state variable at the next time point;

perform a line feature extraction and a surface feature extraction on the de-distortion processed point cloud data to obtain line feature data and surface feature data;

obtain line feature constraint relationship data and surface feature constraint relationship data by performing a registration on the line feature data and pre-generated line features in a feature map, and a registration on the surface feature data and pre-generated surface features in the feature map; and determine a linear velocity in a forward direction, a linear velocity in a horizontal direction, and a yaw angular velocity in an IMU coordinate system by inputting temporally and spatially synchronized wheel speed data of the movable object into a preset vehicle dynamics model.

15. The non-transitory computer-readable storage medium of claim 14, wherein the program instructions when executed by the processor of the computing device, causes the computing device further to:

perform a tightly coupled inter-frame optimization on the point cloud data and the wheel speed data of the movable object in a current sliding window to obtain an initialized LiDAR pose at the current time point in the current sliding window, in response to the number of data observation time points in the preset sliding window being less than the preset threshold number and the IMU data in the preset sliding window being fully stimulated, wherein the initialized LiDAR pose includes a LiDAR rotation matrix and a LiDAR translation vector; and wherein the program instructions when executed by the processor of the computing device, causes the computing device to initialize the state variables to form the initialized state variables comprises the program instructions when executed by the processor of the computing device, causes the computing device to:

adopt consistency constraints of LiDAR rotation change between adjacent frames and a LiDAR rotation increment pre-integration amount between the adjacent frames according to the initialized LiDAR poses at the current time point and at each time point before the current time point, to accumulate the consistency constraints of consecutive multiple frames to obtain an initialized gyroscope bias;

obtain gravitational acceleration in a LiDAR coordinate system according to the initialized LiDAR poses in the current sliding window and the consistency constraints of the offset pre-integration amount, and convert the gravitational acceleration in the LiDAR coordinate system into a world coordinate system to obtain an initialized gravitational acceleration; and determine an initialized velocity by estimating an initial velocity vector according to the initialized gyroscope bias and the initialized gravitational acceleration.

16. The computing device of claim 13, wherein the instructions when executed by the processor, causes the computing device further to:

perform a tightly coupled inter-frame optimization on the point cloud data and the wheel speed data of the movable object in a current sliding window to obtain an initialized LiDAR pose at the current time point in the current sliding window, in response to the number of data observation time points in the preset sliding window being less than the preset threshold number and the IMU data in the preset sliding window being fully stimulated, wherein the initialized LiDAR pose includes a LiDAR rotation matrix and a LiDAR translation vector; and wherein the instructions when executed by the processor, causes the computing device to initialize the state variables to form the initialized state variables comprises the instructions when executed by the processor, causes the computing device to:
  adopt consistency constraints of LiDAR rotation change between adjacent frames and a LiDAR rotation increment pre-integration amount between the adjacent frames according to the initialized LiDAR poses at the current time point and at each time point before the current time point, to accumulate the consistency constraints of consecutive multiple frames to obtain an initialized gyroscope bias;
  obtain gravitational acceleration in a LiDAR coordinate system according to the initialized LiDAR poses in the current sliding window and the consistency constraints of the offset pre-integration amount, and convert the gravitational acceleration in the LiDAR coordinate system into a world coordinate system to obtain an initialized gravitational acceleration; and
determine an initialized velocity by estimating an initial velocity vector according to the initialized gyroscope bias and the initialized gravitational acceleration.

* * * * *